(12) United States Patent
Laker (10) Patent No.: US 8,006,053 B2
(45) Date of Patent: Aug. 23, 2011

(54) SYSTEM, DEVICE, AND METHOD FOR DETECTING AND CONFIGURING MIRROR RELATIONSHIPS IN A STORAGE SYSTEM

(75) Inventor: Mark Stephen Laker, Eastleigh (GB)

(73) Assignee: BlueArc UK Limited, Bracknell, Berkshire (GB)

( * ) Notice: Subject to any disclaimer, the term of this patent is extended or adjusted under 35 U.S.C. 154(b) by 680 days.

(21) Appl. No.: 11/871,401

(22) Filed: Oct. 12, 2007

(65) Prior Publication Data

US 2009/0100222 A1 Apr. 16, 2009

(51) Int. Cl.
*G06F 13/00* (2006.01)
(52) U.S. Cl. .................................. 711/162; 711/114
(58) Field of Classification Search .................. 711/114, 711/162; 707/6; 709/221; 714/7, 25, 37, 714/720
See application file for complete search history.

(56) References Cited

U.S. PATENT DOCUMENTS

| | | | | |
|---|---|---|---|---|
| 5,822,782 | A | * | 10/1998 | Humlicek et al. ............ 711/170 |
| 7,111,194 | B1 | | 9/2006 | Schoenthal et al. |
| 7,434,014 | B2 | * | 10/2008 | Ali et al. ...................... 711/162 |
| 2005/0015407 | A1 | | 1/2005 | Nguyen et al. |
| 2005/0108470 | A1 | * | 5/2005 | Gold et al. ................... 711/111 |
| 2006/0005074 | A1 | | 1/2006 | Yanai et al. |
| 2006/0095662 | A1 | * | 5/2006 | Arnott ......................... 711/114 |

OTHER PUBLICATIONS

Bharat, K. and Broder, A. 1999. "Mirror, mirror on the web: A study of host pairs with replicated content". In Proceedings of the Eighth International Conference on the World-Wide Web, Issue 1 (Aug. 2001).*
International Searching Authority, Authorized officer Vincent Weber, *International Search Report and Written Opinion*, completed Jan. 20, 2009 and mailed Jan. 28, 2009, in a related application PCT/US2008/079287, 13 pages.

* cited by examiner

*Primary Examiner* — Jared I Rutz
(74) *Attorney, Agent, or Firm* — Sunstein Kann Murphy & Timbers LLP (57) ABSTRACT

Mirror relationships between system drives may be detected and/or configured automatically by writing a predetermined data pattern to a predetermined location within a system drive and then checking one or more other system drives for a mirrored copy of the same data pattern. If the data pattern is found in another SD, then it can be assumed that there is a mirror relationship between the two SDs. Failure to find the data pattern in another SD, or finding the data pattern in multiple other SDs, may indicate an error condition. Once mirror relationships are discovered, the mirror relationships can be configured into the file server automatically so that the engineer does not have to manually configure the mirror relationships. The same mechanism can be used to check mirror relationships from time to time, for example, to detect possible problems with the RAID system.

24 Claims, 7 Drawing Sheets

SYSTEM, DEVICE, AND METHOD FOR DETECTING AND CONFIGURING MIRROR RELATIONSHIPS IN A STORAGE SYSTEM

FIELD OF THE INVENTION

The present invention relates to data storage systems, and in particular to detecting and configuring mirror relationships in a data storage system.

BACKGROUND

Raid controllers are often used in data storage systems. Even though a Raid controller uses redundant information to withstand disk-loss, it is still possible for a Raid system to fail and lose data. Raid mirroring is a technique for reducing this risk by copying data between two sets of system drives (SDs)—often referred to alternatively as logical units (LUs)—either within a single Raid system or in two separate Raid systems, possibly at geographically separate sites. Each mirror has a primary SD and a secondary SD. The server writes data to, and reads data from, the primary SD; the Raid controllers automatically copy newly written data to the secondary SD.

If a primary SD is ever lost, an engineer can either break the mirror and discard the old primary SD, or can switch mirror roles, so that the old secondary becomes the new primary and vice versa. In either case, to access and updated previously-stored data, the file server must now use the new primary in place of the old one.

A Raid mirror can be synchronous or asynchronous. Whether a mirror is synchronous or asynchronous determines its behaviour when the file server writes data, but not when it reads data. In a synchronous mirror, the Raid controllers copy data to the secondary SD as soon as the file server writes it to the primary; in an asynchronous mirror, data is initially written only to the primary, and the changed parts of the primary are periodically copied to the secondary SD, typically once every few hours. This copying process is referred to as synchronizing the mirror.

Although SDs are typically larger than disks, they are typically smaller than the filesystems that customers usually want to create. Therefore, file servers such as the BlueArc Titan™ file server typically amalgamate multiple SDs into a larger pool of storage referred to as a span.

File servers may be aware of Raid mirroring. In the BlueArc Titan™ file server, the subsystem that manages spans (referred to as the Span Manager) knows about both primary and secondary SDs. If it detects that mirror roles have been switched, it will automatically stop using the old primary and start using the new one. This process is referred to as "failing over" from one SD to another.

The process of controlling the SDs that the server will use is referred to as "licensing." The file server may be "licensed" for some SDs and "unlicensed" for other SDs. For example if SD "A" is mirrored to SD "B" and SD "B" is mirrored to SD "C", then SDs "A" and "C" may be licensed and SD "B" may be unlicensed in order to prevent the server from using SD "B." In the BlueArc Titan™ file server, with very few exceptions, the server ignores unlicensed SDs, and it automatically loads any pre-existing spans from, and mounts filesystems on, licensed SDs.

When setting up a mirrored system, an engineer typically first sets up mirror relationships on the Raid controllers and then manually configures the SD relationships into the file server. The file server can use the SD relationships to fail over to the correct SD when mirror roles change. However, manual configuration of SD relationships into the file server can be difficult and error-prone. For example, given twenty primary SDs and twenty secondary SDs, it can be difficult for the engineer to tell which secondary corresponds to which primary and so it can be difficult for the engineer to correctly configure the SD relationships into the file server.

SUMMARY OF THE INVENTION

In accordance with one aspect of the invention there is provided a method of detecting mirror relationships for system drives in a storage system. The method involves writing a unique data pattern to each of a number of primary system drives and inspecting each of a number of secondary system drives for a copy of one of the unique data patterns following mirror synchronization.

In accordance with another aspect of the invention there is provided apparatus that provides for detection of mirror relationships for system drives in a storage system. The apparatus includes mirror preparation logic configured to write a unique data pattern to each of a number of primary system drives and mirror detection logic configured to inspect each of a number of secondary system drives for a copy of one of the unique data patterns following mirror synchronization.

In accordance with another aspect of the invention there is provided a system that provides for detection of mirror relationships for system drives. The system includes a RAID system configured to manage mirror relationships between system drives and a data storage server configured to write a unique data pattern to each of a number of primary system drives and inspect each of a number of secondary system drives for a copy of one of the unique data patterns following mirror synchronization.

In various embodiments of the invention, the data patterns may be written to predetermined mirror detection areas of the primary system drives. Each of the data patterns may include a common signature, a common timestamp, a common span identifier, and a unique system drive identifier. A mirror relationship may be configured between a primary system drive associated with a particular data pattern and at least one secondary system drive in which a copy of such data pattern is detected. Additionally, or alternatively, such mirror relationships may be displayed on a console. Mirrors may be synchronized automatically (e.g., synchronously or asynchronously by a RAID system), manually (e.g., by an operator controlling the RAID system), or even by the file server or other storage component (e.g., by sending appropriate commands to a RAID system or other mirror controller).

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

In embodiments of the present invention, mirror relationships between system drives may be detected and/or configured automatically by writing a predetermined data pattern to a predetermined location within a system drive and then checking one or more other system drives for a mirrored copy of the same data pattern. If the data pattern is found in another SD, then it can be assumed that there is a mirror relationship between the two SDs. Failure to find the data pattern in another SD, or finding the data pattern in multiple other SDs, may indicate an error condition. Once mirror relationships are discovered, the mirror relationships can be configured into the file server automatically so that the engineer does not have to manually configure the mirror relationships. The same mechanism can be used to check mirror relationships from time to time, for example, to detect possible problems with the RAID system.

Figure 1:
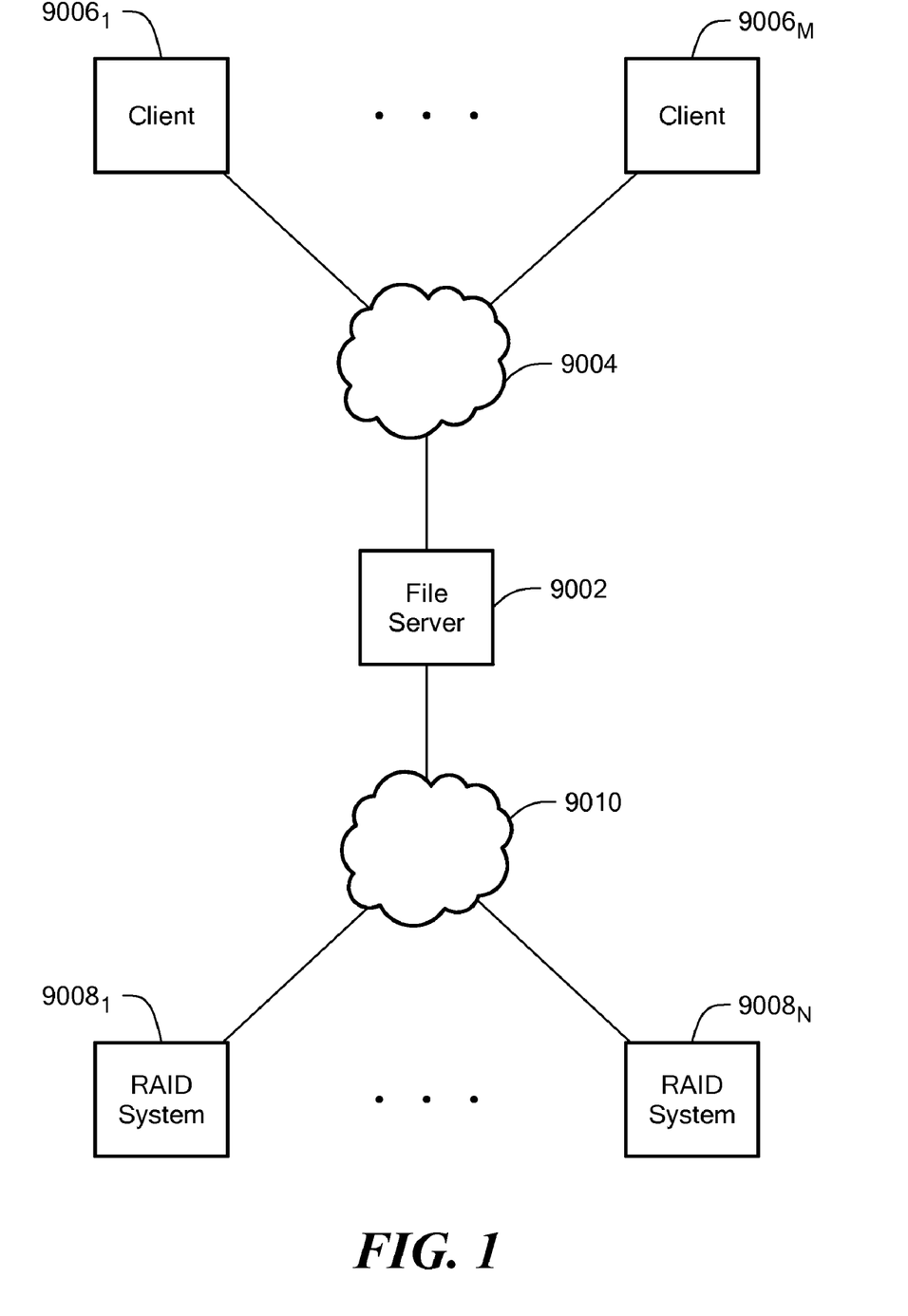
FIG. 1 is a schematic block diagram of a file storage system in accordance with an exemplary embodiment of the present invention.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 manages one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export."

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Figure 2:
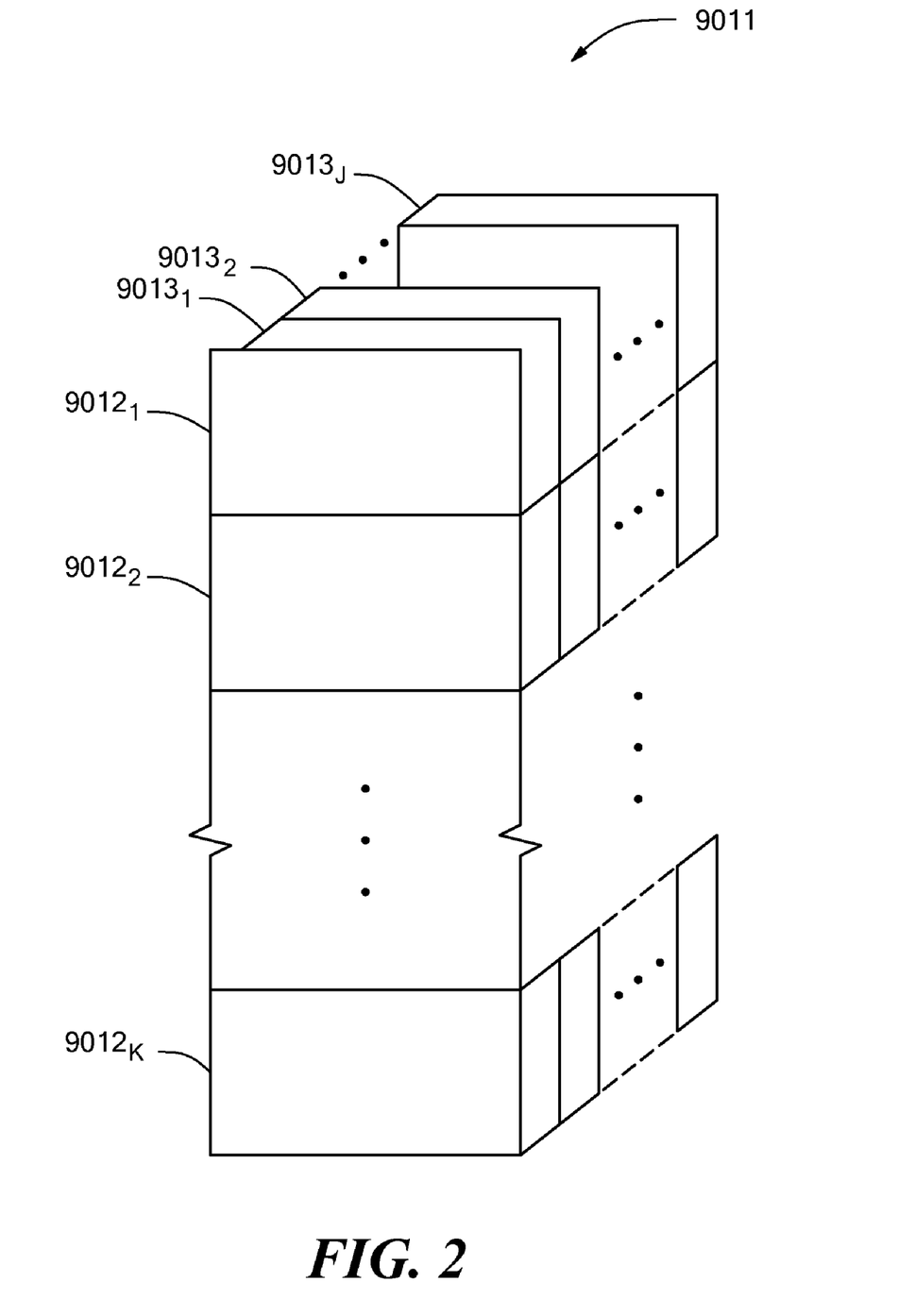
FIG. 2 is a schematic block diagram of a span in accordance with an exemplary embodiment of the present invention.

FIG. 2 is a schematic block diagram of a span in accordance with an exemplary embodiment of the present invention. As shown, the span 9011 is composed of a number of stripesets numbered $9012_1$-$9012_K$ that logically provide a contiguous storage space. Each stripeset 9012 in turn is composed of one or more ranges and therefore one or more SDs. In this example, stripeset $9012_1$ includes ranges numbered $9013_1$-$9013_J$. It should be noted the span 9011 initially contains a single stripeset when the span is created, but additional stripesets may be added to the span over time, and different stripesets may have different numbers of ranges/SDs. When a large amount of data is written to a stripeset, the file server 9002 generally "stripes" the data across multiple ranges/SDs in the stripeset rather than writing all of the data to a single range/SD. For example, when a large amount of data is written, the file server 9002 may write the first 4 MB of data in range/SD $9013_1$, the next 4 MB of data in range/SD $9013_2$, and so on, recycling back to range/SD $9013_1$ after writing data to range/SD $9013_J$. Among other things, such "striping" increases the chances that the file server 9002 is using several SDs (and hence several storage devices), possibly managed by several RAID systems.

Figure 3:
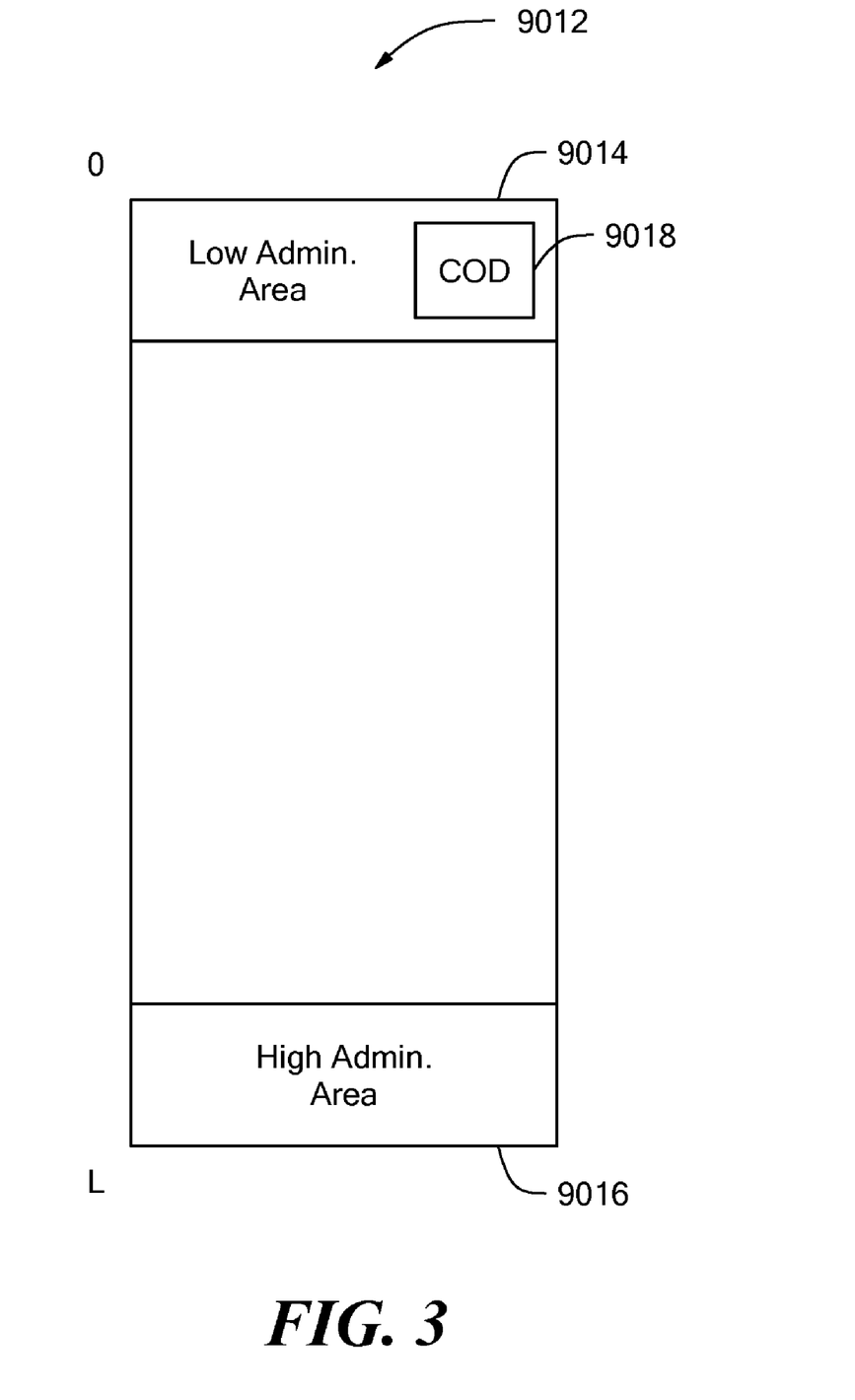
FIG. 3 is a schematic diagram showing a representation of the low admin area with COD at the start of an SD and the high admin area at the end of the SD in accordance with an exemplary embodiment of the present invention.

In embodiments of the present invention, a small region (e.g., 1 MB) at the start and end of each SD in the span is reserved for storage of administrative information. For convenience, the region at the start of the SD is referred to as the "low admin area" and the region at the end of the SD is referred to as the "high admin area." The low admin area includes a portion that is reserved specifically for storage of configuration information (referred to herein as "configuration on disk" or "COD"). FIG. 3 is a schematic diagram showing a representation of the low admin area 9014 with COD 9018 at the start of the SD 9012 and the high admin area 9016 at the end of the SD 9012 in accordance with an exemplary embodiment of the present invention. It should be noted that each SD 9012 in the span 9011 includes COD, and each SD 9012 may be mirrored separately by the RAID system.

When a span is created, a specification of the span is written to the COD region of each SD in the span. For convenience, the span specification may be referred to as "span COD." Also stored in the COD region of each SD is a filesystem catalogue (which specifies such things as the names, IDs, and confining capacity of the filesystems on the span) and a chunk table (which specifies the chunks of storage space that have been allocated to each filesystem, and in which order). For convenience, the filesystem catalogue and chunk table may be referred to as "filesystem COD." No client data is stored in the COD regions. In a "healthy" system, all SDs will have virtually identical COD, and each SD's COD will contain a description of the span and its filesystems.

In an exemplary embodiment, the file server 9002 includes mechanisms for automatically detecting and/or configuring mirror relationships between primary and secondary SDs. Specifically, a mirror relationship is detected for a primary SD by writing a predetermined pattern to a previously unused portion of the low admin area 9014 (referred to herein as a "mirror detection block") of the primary SD. Generally speaking, the primary SD must be licensed (otherwise the file server should not write to it), primary (otherwise the file server cannot write to it), used in a span (otherwise a mirror relationship could not be configured for the SD), and not already configured with a mirror relationship, although the file server technically could write to a primary SD that is already configured with a mirror relationship, e.g., to confirm the mirror relationship. Mirrors are then synchronized, which may be performed automatically by the RAID system (e.g., almost immediately if the RAID system is configured for synchronous mirrors or at some later time if the RAID system is configured for asynchronous mirrors) or may be performed manually by the user. In certain embodiments, it may be possible for the file server 9002 to synchronize mirrors, for example, by sending appropriate commands to the RAID system. In any case, after the mirrors have been synchronized, the file server 9002 inspects the mirror detection blocks of one or more secondary SDs looking for the pattern that was written to the primary SD. Generally speaking, the file server 9002 will inspect all SDs that are licensed, secondary, and not already used in a span, although the file server 9002 may inspect just a single secondary SD (e.g., to confirm a mirror relationship) or may even inspect other SDs (e.g., for detecting potential configuration problems). If the pattern is found in the mirror detection block of a particular secondary SD, then the file server 9002 may deduce that there is a mirror relationship with the primary SD (i.e., that the RAID system mirrored the data from the primary SD to that secondary SD). In an exemplary embodiment, mirrors are only permitted to have one primary SD and one secondary SD. Therefore, if the pattern is found in just one secondary SD, then the file server 9002 may deduce that the two SDs are mirrors of one another. If, however, the pattern is found on multiple secondary SDs, or if the pattern is not found on any secondary SD, then it is possible that there could be a configuration or other problem. Alternative embodiments may permit a mirror to have more than one secondary SD, and the file server 9002 may permit detection of such mirrors using these mechanisms.

Figure 4:
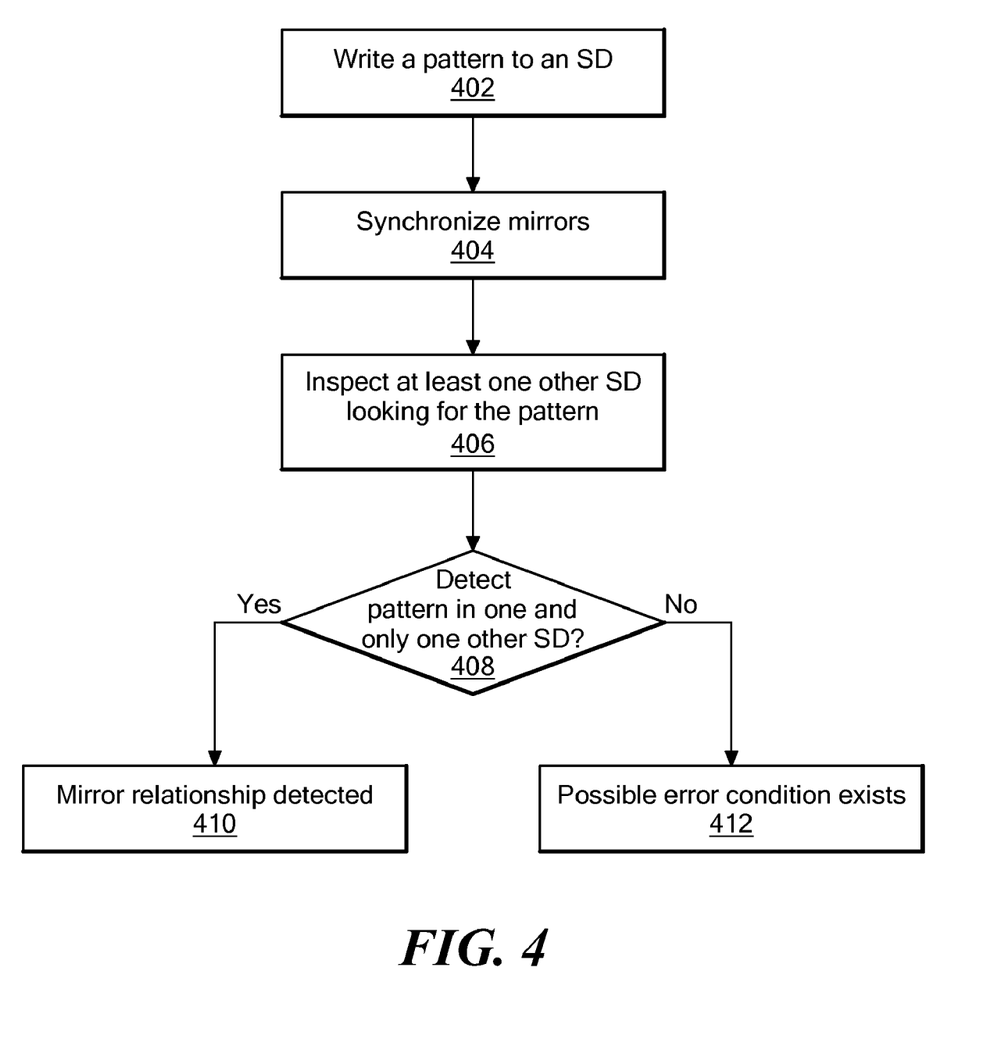
FIG. 4 is a flow chart showing exemplary logic for detecting mirror relationships in accordance with an exemplary embodiment of the present invention.

FIG. 4 is a flow chart showing exemplary logic for detecting mirror relationships in accordance with an exemplary embodiment of the present invention. In block 402, a pattern is written to an SD (typically an unmirrored licensed primary SD that is used in a span but is not already configured with a mirror relationship). In block 404, the mirrors are synchronized, e.g., by the RAID system synchronously or asynchronously, manually by the user, or perhaps by the file server itself. In block 406, at least one other SD (typically a licensed secondary SD that is not already used in a span) is inspected for the pattern. If the pattern is detected in one and only one other SD (YES in block 408), then a mirror relationship is detected, in block 410; otherwise (NO in block 408), a possible error condition exists, in block 412. As discussed above, such a mirror relationship detection scheme would generally be used to detect mirror relationships between unmirrored licensed primary SDs that are already in a span and licensed, secondary SDs that are not already in a span, although the present invention is not limited thereto. After a mirror relationship is detected, the mirror relationship may be automatically configured in the file server 9002. Alternative embodiments may permit a mirror to have more than one secondary SD, and the file server 9002 may permit detection of such mirrors using these mechanisms.

In an exemplary embodiment, mirror relationships may be detected for multiple primary SDs in a single span at once (e.g., all unmirrored licensed primary SDs in the span), specifically by writing a different pattern to each of those SDs and later looking for those patterns in licensed secondary SDs that are not already in a span. So, in an exemplary embodiment, detection of mirror relationships is essentially a three stage process. First, a unique pattern is written to the mirror detection block of each unmirrored licensed primary SD in the span. Then, mirrors are then synchronized (e.g., automatically or manually). Then, the mirror detection block of each licensed secondary SD that is not used in a span is checked for one of the written patterns. If the file server finds a secondary SD containing a duplicate copy of a pattern that was written to a particular primary SD, and the file server does not find the same pattern in another SD, then the file server may deduce that there is a mirror relationship between the two SDs.

Figure 5:
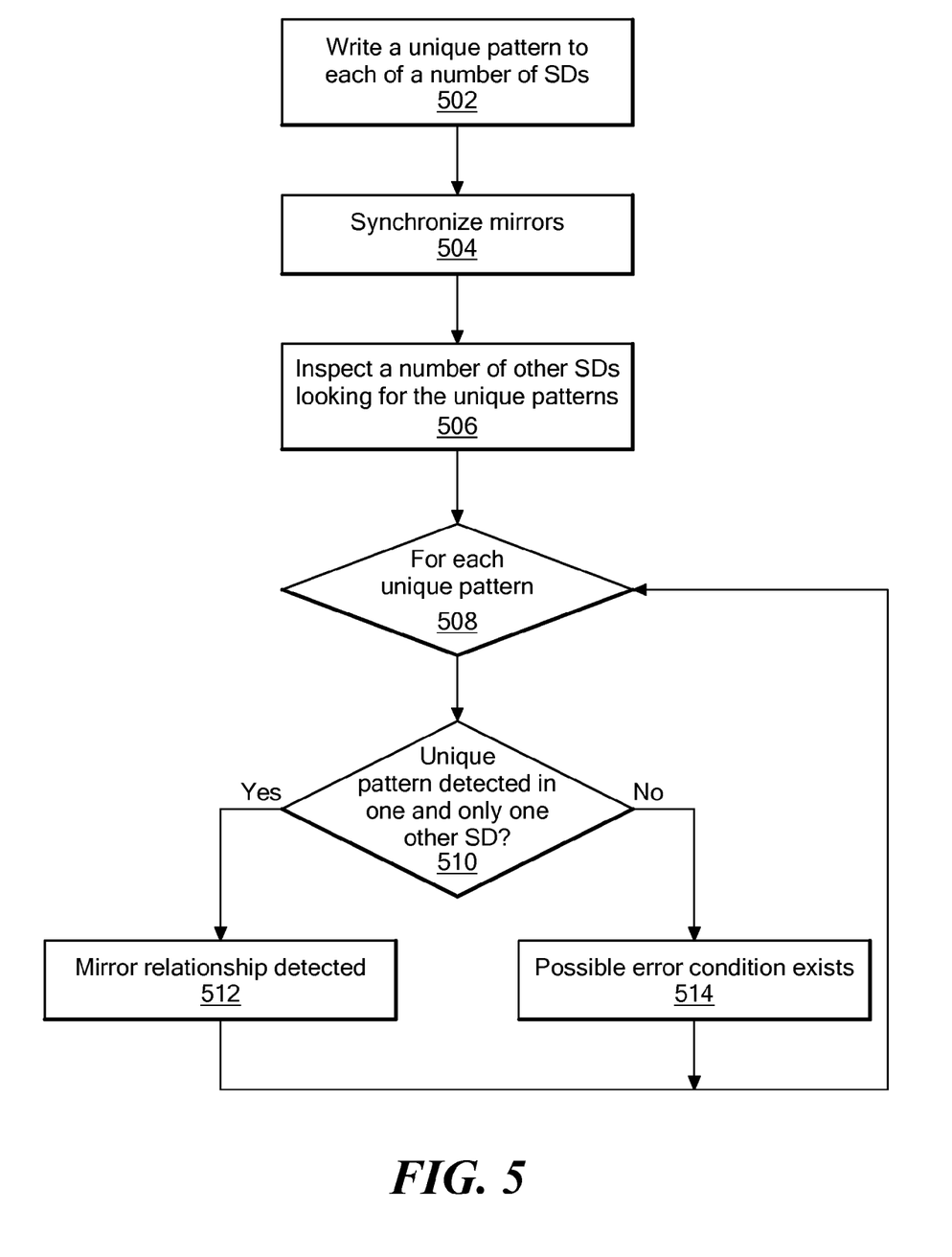
FIG. 5 is a flow chart showing exemplary logic for detecting mirror relationships for multiple SDs in accordance with an exemplary embodiment of the present invention.

FIG. 5 is a flow chart showing exemplary logic for detecting mirror relationships for multiple SDs in accordance with an exemplary embodiment of the present invention. In block 502, a unique pattern is written to each of a number of SDs (typically unmirrored licensed primary SDs that are used in a span but are not already configured with a mirror relationship). In block 504, the mirrors are synchronized, e.g., by the RAID system synchronously or asynchronously, manually by the user, or perhaps by the file server itself. In block 506, a number of other SDs (typically licensed secondary SDs that are not already used in a span) are inspected looking for the unique patterns. For each unique pattern (block 508), if the unique pattern is detected in one and only one other SD (YES in block 510), then a mirror relationship is detected, in block 512; otherwise (NO in block 510), a possible error condition exists, in block 514. As discussed above, such a mirror relationship detection scheme would generally be used to detect mirror relationships between unmirrored licensed primary SDs that are already in a span and licensed, secondary SDs that are not already in a span, although the present invention is not limited thereto. After a mirror relationship is detected, the mirror relationship may be automatically configured in the file server 9002. Alternative embodiments may permit a mirror to have more than one secondary SD, and the file server 9002 may permit detection of such mirrors using these mechanisms.

In an exemplary embodiment, mirror relationships may be detected in either a default/asynchronous mode or a synchronous mode.

In the default/asynchronous mode, the engineer first runs a command called 'sd-mirror-prepare', specifying a span label.

In response to the 'sd-mirror-prepare' command, the server finds all of the licensed primary SDs associated with the specified span for which no mirror relationship has been configured and writes a unique data pattern (described below) to the mirror detection block of each of those SDs. The server also prints a timestamp to the console and prompts the engineer to synchronize mirrors. Then, the engineer may synchronize mirrors manually if necessary (e.g., if the mirrors are asynchronous); alternatively, the engineer may wait for the mirrors to be synchronized automatically. In any case, after the mirrors are synchronized, the engineer then runs a command called 'sd-mirror-detect', specifying the span label and the timestamp printed earlier and optionally including a "commit" switch. In response to the 'sd-mirror-detect' command, the server scans the mirror detection block of each licensed, secondary SD that is not already used in a span. If the server finds one and only one SD containing a copy of the data pattern that was written during the 'sd-mirror-prepare' process, then the server may deduce that the primary and secondary SDs containing the same data are mirrors of one another. If the 'sd-mirror-detect' command is run without the "commit" switch, then the server prints out the mirror relationships it has detected but does not configure the mirror relationships into the server. If, however, the 'sd-mirror-detect' command is run with the "commit" switch, then the server configures the mirror relationships into the server.

Figure 6:
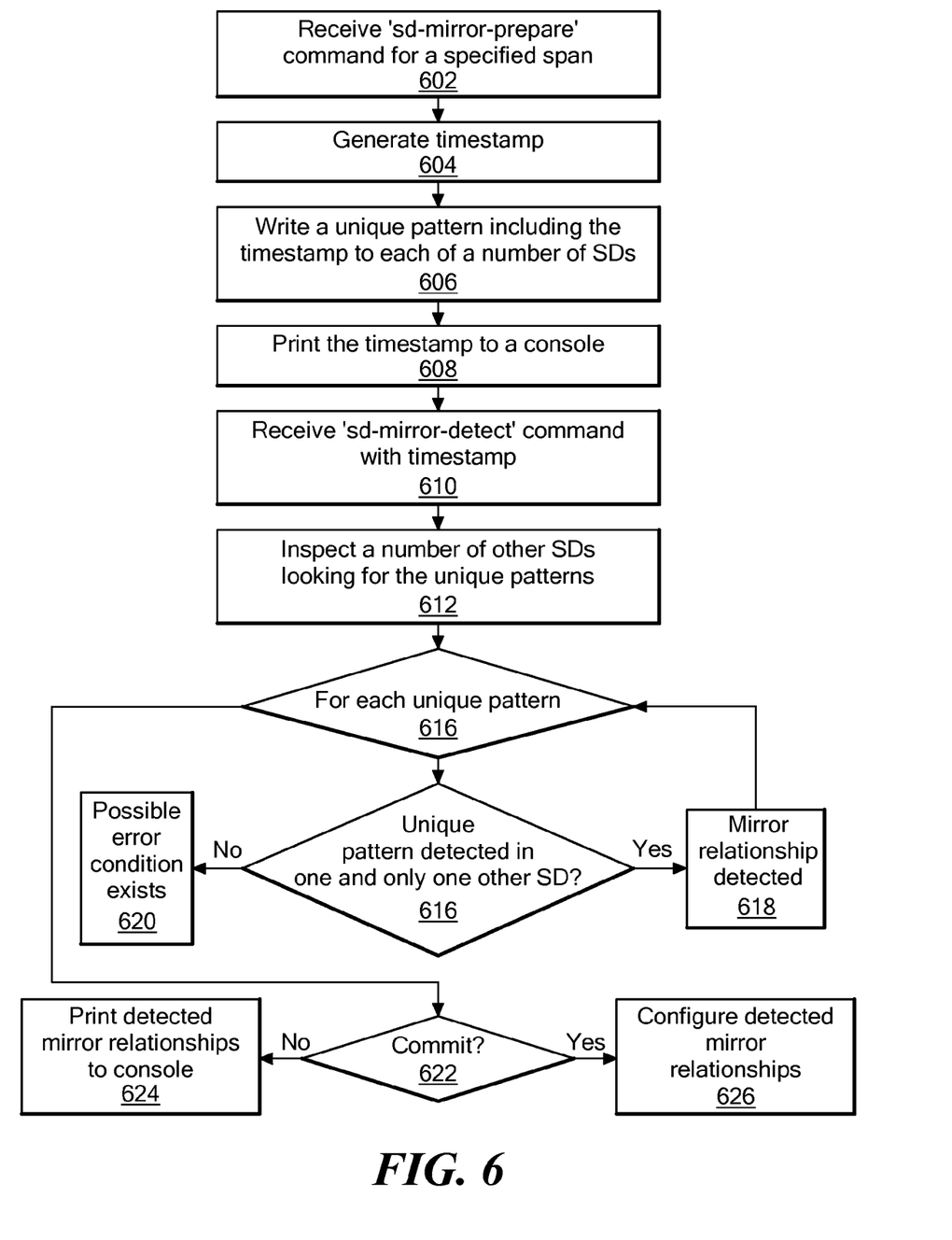
FIG. 6 is a flow chart showing exemplary logic for detecting mirror relationships in a default/asynchronous mode in accordance with an exemplary embodiment of the present invention.

FIG. 6 is a flow chart showing exemplary logic for detecting mirror relationships in a default/asynchronous mode in accordance with an exemplary embodiment of the present invention. Upon receipt of an 'sd-mirror-prepare' command for a specified span in block 602, a timestamp is generated in block 604, and a unique pattern including the timestamp is written to each of a number of primary SDs in block 606. The timestamp is printed to the console in block 608. Upon receipt of an 'sd-mirror-detect' command with timestamp in block 610, a number of secondary SDs are inspected looking for the unique patterns in block 612. For each unique pattern (block 614), if the unique pattern is detected in one and only one other SD (YES in block 616), then a mirror relationship is detected, in block 618; otherwise (NO in block 616), a possible error condition exists, in block 620. After detecting mirror relationships, if the command was entered without the "commit" switch (NO in block 626), then the detected mirror relationships are printed to the console in block 624; otherwise (YES in block 626), the detected mirror relationships are configured in block 626.

In the synchronous mode, the engineer runs the 'sd-mirror-prepare' command and includes a "synchronous" switch and optionally includes "commit" switch. As described above, in response to the 'sd-mirror-prepare' command, the server finds all of the licensed primary SDs associated with the specified span for which no mirror relationship has been configured and writes a unique data pattern (described below) to the mirror detection block of each of those SDs. Unlike the default/asynchronous mode, however, rather than just printing the timestamp and waiting for the engineer to enter the 'sd-mirror-detect' command, the server proceeds directly to the detection phase (i.e., as if the engineer had entered the 'sd-mirror-detect' command including the timestamp) under the assumption that data will be mirrored automatically due to synchronous mirroring. As above, if the command is run without the "commit" switch, then the server prints out the mirror relationships it has detected but does not configure the mirror relationships into the server. If, however, the command is run with the "commit" switch, then the server configures the mirror relationships into the server.

Figure 7:
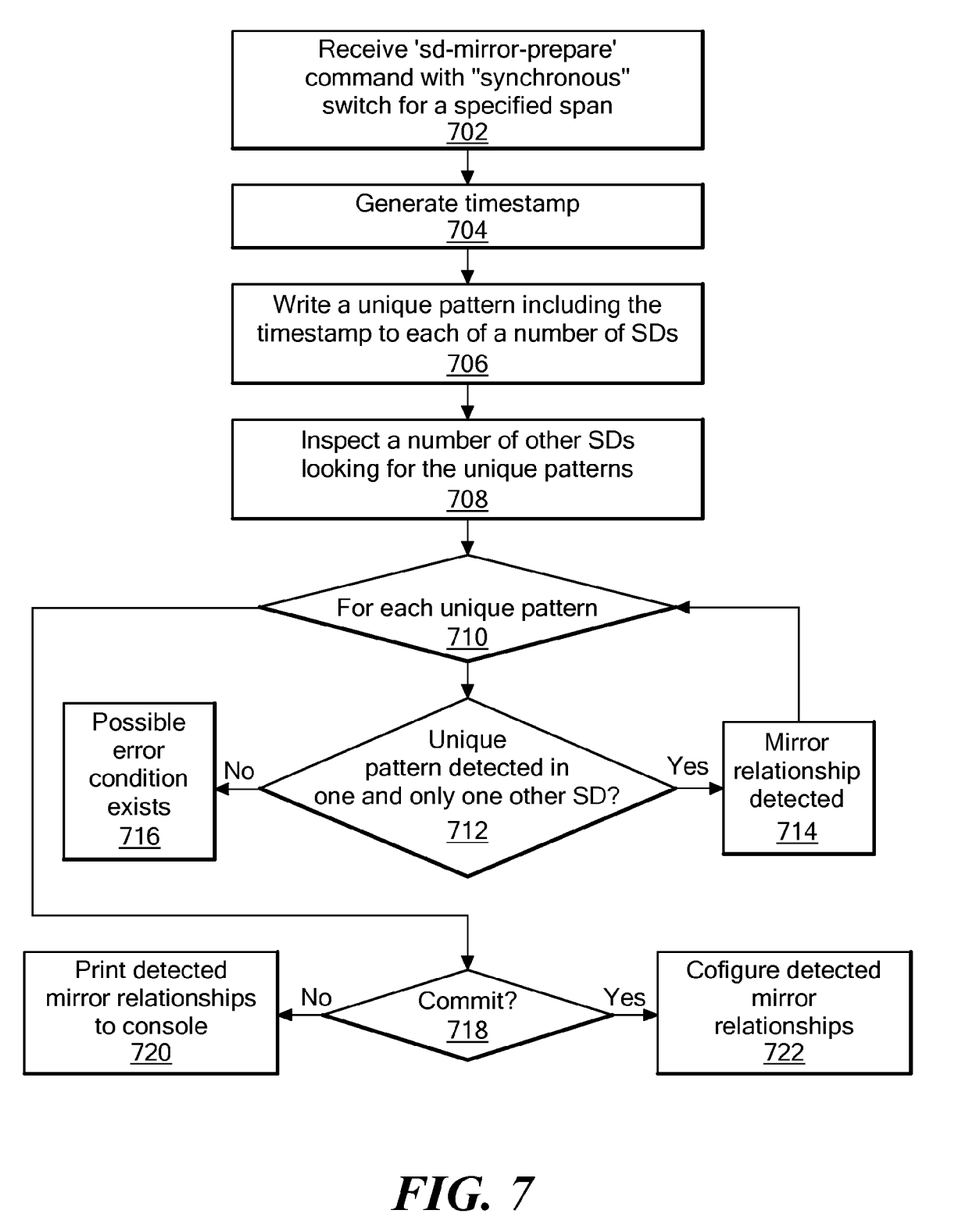
FIG. 7 is a flow chart showing exemplary logic for detecting mirror relationships in a synchronous mode in accordance with an exemplary embodiment of the present invention.

FIG. 7 is a flow chart showing exemplary logic for detecting mirror relationships in a synchronous mode in accordance with an exemplary embodiment of the present invention. Upon receipt of an 'sd-mirror-prepare' command with "synchronous" switch for a specified span in block 702, a timestamp is generated in block 704, and a unique pattern including the timestamp is written to each of a number of SDs in block 706. Then, a number of other SDs are inspected looking for the unique patterns in block 708. For each unique pattern (block 710), if the unique pattern is detected in one and only one other SD (YES in block 712), then a mirror relationship is detected, in block 714; otherwise (NO in block 712), a possible error condition exists, in block 716. After detecting mirror relationships, if the command was entered without the "commit" switch (NO in block 718), then the detected mirror relationships are printed to the console in block 720; otherwise (YES in block 718), the detected mirror relationships are configured in block 722.

It should be noted that the engineer may perform mirror detection without the "commit" switch, for example, as a "dry run" before making any actual configuration changes, and then re-run the command with the "commit" switch to commit the mirror relationships. Thus, for example, the engineer may run the 'sd-mirror-detect' command with the timestamp but without the "commit" switch to see the detected mirror relationships and then run the same command with the "commit" switch to configure the mirror relationships.

In an exemplary embodiment, the data written to the mirror detection block includes:

A) A four-byte signature, used to reduce the likelihood that random, pre-existing data will resemble a mirror detection block.

B) A four-byte timestamp, so that multiple runs of 'sd-mirror-prepare' will all write different data.

C) An eight-byte number that uniquely identifies the span (the span's "permanent ID").

D) An SD device identifier, which allows each SD to be uniquely identified.

It should be noted that, by including a timestamp in the mirror detection block, different instantiations of the mirror detection process will result in different data being written to the SDs. Thus, for example, if the engineer were to run 'sd-mirror-prepare' once, change mirror roles, and then run 'sd-mirror-prepare' again, the server will not be confused when the 'sd-mirror-detect' operation is run.

It should also be noted that, by including the span identifier in the mirror detection block, in the unlikely event that two engineers run 'sd-mirror-prepare' on different spans at roughly the same time (and thus with the same timestamp), the server will not be confused by the same timestamps.

It should also be noted that, in various embodiments of the invention, the mirror relationship detection function may be performed from time to time by the engineer and/or automatically by the file server, for example, to confirm mirror relationships and to detect certain types of errors more quickly.

It should also be noted that various embodiments of the invention may permit detection and/or configuration of mirror relationships having more than two SDs. For example, a RAID system may permit mirroring of a primary SD to two or more "secondary" SDs, and such a mirror configuration may be detected by writing a pattern to the primary SD and finding mirrored copies of the pattern in two or more secondary SDs.

It should also be noted that the present invention is not limited to inspecting only secondary SDs. In various embodiments, after writing a pattern to a primary SD, both primary and secondary SDs could be inspected for the pattern. Finding the pattern in another primary SD might indicate a serious configuration error in either the RAID system or the file server.

While various exemplary embodiments are described above, it should be noted that the present invention is not limited to such embodiments. For example, different types of data patterns may be used in alternative embodiments, and the data patterns may be written in different ways to different physical and logical storage constructs. Also, additional logic may be included to automate mirror synchronization in an asynchronous mirror environment, e.g., by sending mirror synchronization commands from the file server to the RAID system.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method of detecting mirror relationships for system drives in a storage system, the method comprising:
    writing a unique data pattern to each of a number of primary system drives; and
    inspecting each of a number of secondary system drives following mirror synchronization for a copy of one of the unique data patterns written to a primary system drive.

2. A method according to claim 1, wherein the data patterns are written to a predetermined mirror detection area of the primary system drives.

3. A method according to claim 1, wherein each of the data patterns include:
    a common signature;
    a common timestamp;
    a common span identifier; and
    a unique system drive identifier.

4. A method according to claim 1, further comprising:
    configuring a mirror relationship between the primary system drive associated with such data pattern and at least one secondary system drive in which the copy of the data pattern is detected.

5. A method according to claim 1, further comprising:
    displaying on a console a mirror relationship between the primary system drive associated with such data pattern and at least one secondary system drive in which the copy of the data pattern is detected.

6. A method according to claim 1, wherein mirrors are automatically synchronized by a RAID system.

7. A method according to claim 1, wherein mirrors are synchronized manually.

8. A method according to claim 1, wherein mirrors are synchronized by a storage server sending appropriate commands to a mirror storage system.

9. Apparatus providing for detection of mirror relationships for system drives in a storage system, the apparatus comprising:
    mirror preparation logic configured to write a unique data pattern to each of a number of primary system drives; and
    mirror detection logic configured to inspect each of a number of secondary system drives following mirror synchronization for a copy of one of the unique data patterns written to a primary system drive.

10. Apparatus according to claim 9, wherein the data patterns are written to a predetermined mirror detection area of the primary system drives.

11. Apparatus according to claim 9, wherein each of the data patterns include:
    a common signature;
    a common timestamp;
    a common span identifier; and
    a unique system drive identifier.

12. Apparatus according to claim 9, wherein the mirror detection logic is configured to configure a mirror relationship between the primary system drive associated with a particular data pattern and at least one secondary system drive in which a copy of such data pattern is detected.

13. Apparatus according to claim 9, wherein the mirror detection logic is configured to display on a console a mirror relationship between the primary system drive associated with a particular data pattern and at least one secondary system drive in which a copy of such data pattern is detected.

14. Apparatus according to claim 9, wherein mirrors are automatically synchronized by a RAID system.

15. Apparatus according to claim 9, wherein mirrors are synchronized manually.

16. Apparatus according to claim 9, wherein mirrors are synchronized by at least one of the mirror preparation logic and the mirror detection logic sending appropriate commands to a mirror storage system.

17. A system providing for detection of mirror relationships for system drives, the system comprising:
    a RAID system configured to manage mirror relationships between system drives; and
    a data storage server configured to write a unique data pattern to each of a number of primary system drives and inspect each of a number of secondary system drives following mirror synchronization for a copy of one of the unique data patterns written to a primary system drive.

18. A system according to claim 17, wherein the data patterns are written to a predetermined mirror detection area of the primary system drives.

19. A system according to claim 17, wherein each of the data patterns include:
    a common signature;
    a common timestamp;
    a common span identifier; and
    a unique system drive identifier.

20. A system according to claim 17, wherein the data storage server is configured to configure a mirror relationship between the primary system drive associated with a particular data pattern and at least one secondary system drive in which a copy of such data pattern is detected.

21. A system according to claim 17, wherein the mirror detection logic is configured to display on a console a mirror relationship between the primary system drive associated with a particular data pattern and at least one secondary system drive in which a copy of such data pattern is detected.

22. A system according to claim 17, wherein mirrors are automatically synchronized by the RAID system.

23. A system according to claim 17, wherein mirrors are synchronized manually via the RAID system.

24. A system according to claim 17, wherein mirrors are synchronized by the data storage server sending appropriate commands to a mirror storage system.

* * * * *